(12) United States Patent
Smith (10) Patent No.: US 6,883,822 B1
(45) Date of Patent: Apr. 26, 2005

(54) INTERCHANGEABLE BALL HITCH ASSEMBLY

(76) Inventor: Jerry R. Smith, 5690 W. Rowland Ave., Littleton, CO (US) 80123

( * ) Notice: Subject to any disclaimer, the term of this patent is extended or adjusted under 35 U.S.C. 154(b) by 0 days.

(21) Appl. No.: 10/721,816

(22) Filed: Nov. 24, 2003

(51) Int. Cl.$^7$ ................................................ B60D 1/06
(52) U.S. Cl. ........................ 280/511; 280/504; 280/507
(58) Field of Search ................................. 280/511, 504, 280/507

(56) References Cited

U.S. PATENT DOCUMENTS

| | | |
|---|---|---|
| 4,060,331 A | 11/1977 | Domer et al. |
| 4,230,336 A | 10/1980 | Avrea et al. |
| 4,433,854 A | 2/1984 | Smith |
| 4,596,406 A | 6/1986 | Van Vleet et al. |
| 4,938,496 A | 7/1990 | Thomas et al. |
| 5,116,072 A | 5/1992 | Swenson |
| 5,169,168 A * | 12/1992 | Harry et al. ................. 280/511 |
| 5,290,057 A | 3/1994 | Pellerito |
| 5,419,576 A | 5/1995 | Van Vleet |
| 5,511,814 A | 4/1996 | Floyd |
| 5,860,669 A * | 1/1999 | Wass et al. ................ 280/416.1 |
| 5,871,222 A * | 2/1999 | Webb .......................... 280/511 |
| 6,206,400 B1 | 3/2001 | Stech |
| 6,715,781 B1 | 4/2004 | Smith |
| 6,783,144 B1 * | 8/2004 | McCoy et al. .............. 280/511 |
| 2001/0030410 A1 | 10/2001 | McCoige et al. |

* cited by examiner

*Primary Examiner*—Lesley D. Morris
*Assistant Examiner*—L. Lum
(74) *Attorney, Agent, or Firm*—Timothy J. Martin; Michael R. Henson; Rebecca A. Gegick (57) ABSTRACT

A hitch ball assembly includes a mounting element secured to a vehicle and having an upright post with a cylindrical end portion provided with a key structure and a hitch ball that is keyed to be mated on that end portion in one rotational state. The hitch ball may be rotated to a second rotational state wherein the key structure is trapped in a cavity in the ball. A latch notch is provided in either the ball or the post, and a latch element in provided the other of them. The latch element can move between a latch position to prevent rotation of the ball thereby to maintain engagement and an unlatch position to permit rotation and thereby separation of the ball from the post. A spring clip may be used to hold the latch element in the latch position.

32 Claims, 4 Drawing Sheets

INTERCHANGEABLE BALL HITCH ASSEMBLY

FIELD OF THE INVENTION

The present invention generally relates to trailer hitches of the type commonly used to connect a towing vehicle to a trailer and, more particularly, to a ball hitch assembly having removable and easily interchangeable balls including structure for preventing the inadvertent disassembly of the hitch.

BACKGROUND OF THE INVENTION

Trailer hitches are devices which connect a tow vehicle to a trailer by means of a ball hitch which is mounted onto the vehicle, or onto a tow bar which is connected to the vehicle. The hitch then mates with a hitch ball socket. This ball and socket configuration is designed to allow adequate rotation of the socket with respect to the ball so that the vehicle-trailer combination can maneuver around corners. Typically the socket mechanism has a releasably lockable coupling so that it locks onto the ball hitch to prevent decoupling while towing.

There are several standardized sizes of these ball and socket systems, the specific size usually depends on the size of the trailer or its weight and is specified by the outer diameter of the hitch ball. Typical ball sizes are diameters of 1⅞ inches, 2 inches, 2¼ inches, and 2 5/16 inches. For a trailer hitch to function properly and safely, it is important that the size of the ball matches that required by the particular hitch socket. Using a ball that is smaller than the size specified for the trailer could have disastrous consequences, and coupling a trailer with a ball that is too large for its socket is impossible. A vehicle may need to tow a variety of trailers, with sockets of different sizes, and hence there is a need to be able to employ different sizes of hitch balls on a vehicle.

Conventional hitch balls include a mounting bolt and ball as an integral unit. The unit is bolted onto the tow bar and requires at least one wrench for its removal and installation. This can be inconvenient because it requires that one carry the proper tools in the vehicle, as well as a variety of hitch balls, which can have their threads damaged if not properly stored. Additionally, the hitch ball mounting threads may become corroded or filled with debris so that removing the ball can be a formidable task, especially when trying to change a hitch ball at night in the rain. It is usually not feasible to have multiple, different-sized balls bolted to a vehicle because the ball must be located along the centerline of the vehicle and at a preferred height in order to evenly distribute the loads acting on the vehicle and trailer.

With the purpose of overcoming these problems, several types of hitches, which present other schemes of interchanging balls, have been invented. For example, U.S. Pat. No. 4,433,854 issued Feb. 28, 1984 to Smith shows an interchangeable ball hitch in which the ball contains a spring-biased latch that locks the ball onto a mounting piece which is attached to the tow bar and which can be released for interchanging the ball sizes. The latch includes a spring and pin which are integral to the mounting piece. This device requires that the ball be rotated into the proper position for removal which can be difficult if trying to change a ball at night without a flashlight.

U.S. Pat. No. 5,169,168 issued Dec. 8, 1992 to Harry et al describes a hitch ball assembly including interchangeable balls and a mounting post which is attached to the tow bar. The mounting post contains a grooved path and the ball has a pin on the inner cavity of the ball. To mount the ball one must align the pin with the beginning of the groove at the top of the post and then rotate and depress the ball to move the pin along the groove until it has fully seated. Once seated, the ball is free to rotate around the mounting post. The pin can be damaged during towing by the trailer loads if the tolerances of the fit between the ball and post are too large or if the ball binds up in the hitch socket and then applies those extra loads to the post. In these instances a large portion of the trailer forces are being transferred to the vehicle through just the pin.

U.S. Pat. No. 5,419,576 issued May 30, 1995 to Van Vleet, describes an interchangeable ball hitch connector which includes an interchangeable ball and a mounting post which is bolted onto the tow bar. The ball has a chamber which the mounting post fits within. Both the ball and the post have holes which are aligned when the ball is in place and through which a locking pin is placed to hold the two parts together.

U.S. Pat. No. 5,871,222 issued Feb. 16, 1999 to Webb describes a detachable ball hitch apparatus which includes a ball hitch with an integral post that fits into the cavity of a piece that mounts onto the tow bar. The post has a spring-loaded pin that slides into a groove in the tow bar piece. When the ball is fully mounted the pin is depressed to lock it into the groove to prevent its unintentional removal. Once installed, the ball is not free to rotate. If the spring should fail, the ball cannot be easily removed from the tow bar. Also, the pin and spring are located inside of the ball so this device would be more expensive than others because each of the interchangeable balls must contain those pieces.

U.S. patent application Ser. No. 10/286,005 filed Oct. 31, 2002 by Smith, an inventor in the present application, describes an interchangeable hitch ball system which includes a threaded mounting post and hitch balls with partially threaded cavities. A hitch ball is mounted onto the post by engaging the threads and screwing the ball onto the post. Once the threaded portion of the cavity passes the mounting post threads, the ball is in fully mounted and is free to turn. The hitch ball is disengaged by lifting the ball and turning it to re-engage the threads and then unscrewing the hitch ball.

While the above-described structures teach the use of detachable and/or interchangeable hitch balls for towing applications, there remains a need for improved interchangeable hitch ball assemblies. This need manifests in both the need for simplified structures as well as structures that can be manufactured efficiently at a reduced cost. The present invention is directed to providing an improved construction for interchangeable hitch ball systems.

SUMMARY OF THE INVENTION

It is the object of the present invention to provide for an improved tow hitch which includes an easily interchangeable hitch ball and which mates with standard hitch ball sockets.

It is another object of the present invention to provide a new and useful hitch ball and mounting structure that allows easy interchange of hitch balls of various sizes for different towing applications. A further object of the present invention is to provide an interchangeable hitch ball assembly that is easy to manufacture yet which is durable in use.

Still a further object of the present invention which provides for interchangeable hitch balls that can be disengaged and re-engaged yet are readily removed from a tow bar.

According to the present invention, then, an interchangeable hitch ball assembly for towing a trailer is provided. The hitch ball assembly generally includes a mounting element that is adapted to be secured to a vehicle and a hitch ball element that is adapted to be secured to the mounting element to define a mounted state. The assembly also includes a latch element on one of the mounting element or hitch ball element and a latch notch on the other. The hitch ball element is typically of a spherical shape of a selectable size, the size selected to match the size of the hitch ball socket to be used. To mount a hitch ball element onto a mounting element, the hitch ball is rotated to a first rotational position wherein it can be placed onto the post in a mated state. The hitch ball can then be rotated to a second rotational position wherein the hitch ball element is prevented from moving longitudinally with respect to the mounting element. Once in the second rotational position the latch element can be pivoted from an unlatch position to a latch position to engage a latch notch. In the latch position the hitch ball element is prevented from rotating with respect to the mounting element.

The mounting element is shown to include an upright post, a base and means for securing the base to the vehicle, such as by a mounting shank. When the post is supported on the base this mounting shank extends co-axially of the post and oppositely thereof. The mounting shank then receives a fastener, such as a nut, to secure the base to the vehicle, such as a tow bar, a bar hitch, etc.

The aforementioned upright post has a diameter $d_1$ and a key structure comprised of one or more ears which protrude from the post in a radial direction with respect to a longitudinal axis A defined by the post. The outer dimension of the ears' protrusion is $d_3$ and the longitudinal dimension of the ears is $l_1$. The upright post terminates in a free end portion. The hitch ball element contains a passageway into which the free end portion is inserted for the assembly of the hitch ball element and mounting element. The passageway includes an entryway with a circular central opening, an internal cavity, and a cylindrical bore, all of which are located along a rotational axis B which is coincident with the longitudinal axis A when the assembly is in the mated state. The circular central opening has a diameter $d_4$ which is selected to be greater than the post diameter $d_1$ but is less than the outer dimension of the ears $d_3$. The central opening has one or more channels formed into it which are sized to allow the ears to pass through the opening when the post is inserted into the central opening while the assembly is in the first rotational position.

The internal cavity is an annular shaped region with an outer diameter $d_5$ and an inner diameter $d_4$. When in the mated state, the ears are located within this annular cavity and the diameter $d_5$ is chosen so that it exceeds the outer ear dimension $d_3$. The cavity has a longitudinal height of $l_2$ which is selected to be greater than $L_1$, the height of the ears. In this manner, the hitch ball is free to rotate with respect to the mounting element when the hitch ball element and mounting element are in the mated state. A cylindrical bore, located in the hitch ball passageway opposite of the entryway, has a diameter $d_2$ which is the same as the central opening diameter $d_4$.

One of the mounting element and the hitch ball element includes a latch element while the other of the mounting element and the hitch ball element has a latch notch formed therein. When the latch element is in the latch position it engages the latch notch and prevents the hitch ball element from being rotated out of the second rotational position. The latch element is a disk-shaped section of a circular section with a curved surface sized to conform to the outer spherical surface of the hitch ball element such that it does not interfere with the hitch ball's use with a standard hitch socket.

The latch element may be pivotally mounted onto the hitch ball element wherein it engages a latch notch, configured as a slot and located in a transverse face of the free end portion of the mounting element, when the assembly is in the second rotational position of the mated state. The notch may also contain a spring clip which mechanically grips the latch element, when in the latch position, to prevent inadvertent unlatching.

Conversely, the latch element may also be pivotally mounted onto the free end portion of the mounting element. In this configuration the free end portion of the upright post includes two spaced-apart supports in an opposing relation to one another. The supports provide a loose-fitting engagement for the latch element with the supports by way of an axle pin. The latch element contains an elongated slot through which the axle pin passes to provide the engagement. Also in this configuration, the hitch ball element contains a latch groove which the latch element engages, when in the latch position, to prevent the rotation of the hitch ball element with respect to the mounting element.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

The present invention is directed to a hitch ball assembly that allows ready interchange of hitch ball elements having different sizes or dimensions so that different towing configurations can be established between a tractor vehicle and a trailer vehicle. The present invention is also directed to a method for providing such interchangeable hitch ball assemblies.

According to the present invention, the hitch ball assembly broadly includes a mounting element that is adapted to be secured to a vehicle and a hitch ball element that is adapted to be secured to the mounting element to define an assembled state. The mounting element broadly includes a base and a mounting shank which present a structure for attaching it to a tow bar on the vehicle or trailer.

The mounting element also includes an upright post with a key structure which mates with a cavity formed within the hitch ball. The cavity includes a bore and a channel which is shaped to allow the insertion of the hitch ball onto the upright post with key structure. The key structure broadly includes at least one ear, mounted onto the upright post, which protrudes beyond it's outer diameter. An exemplary embodiment of the present invention includes a pair of ears on opposite sides of the upright post. To mount a hitch ball element onto a mounting element, the ears pass through channels formed into the cavity. Once the hitch ball is fully inserted onto the post, the ears pass beyond the channels and into a larger cavity within the hitch ball. The cavity is sized large enough to allow the free rotation of the protruding ears but to prevent any significant longitudinal movement of the hitch ball with respect to the post. To fully engage the hitch ball onto the mounting element, the hitch ball is rotated to a position which allows a latch to engage the two. The present invention may also include two or more hitch ball elements of different sizes.

Either the hitch ball element or the upright post includes a latch element which prevents the hitch ball from being removed from, or rotated with respect to, the mounting element. The latch is oriented in an unlatch position for the hitch ball's insertion into, or removal from, the mounting element. Once the hitch ball is inserted and rotated, the latch is moved to the latch position and thereby prevents the hitch ball from being rotated. The other of the hitch ball element or the upright post includes a latch notch which receives the latch, when in the latch position, and prevents the relative rotation of the hitch ball element with respect to the mounting element. The latch is shaped such that, when the latch is in the latch position, the hitch ball and latch combination present a spherical shape that fits the cavity within the trailer hitch socket.

Figures 1, 2:
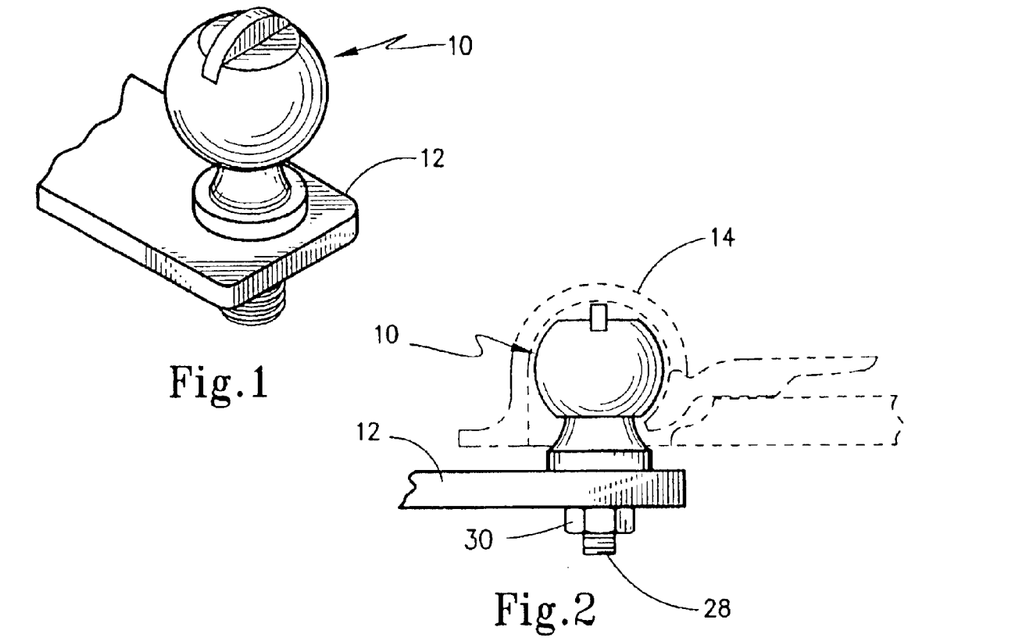
FIG. 1 is a perspective view of an assembled interchangeable hitch ball assembly.
FIG. 2 is a side view of a mounted interchangeable hitch ball assembly with a mounted hitch ball socket and trailer tongue shown in phantom.

To fully understand the details of the present invention reference is first made to a first exemplary embodiment shown in FIGS. 1 through 12. FIG. 1 shows a perspective view of the interchangeable hitch ball 10 mounted onto the end portion of a tow bar 12. The tow bar may be attached to either the tow vehicle or the trailer. In this figure the hitch ball is shown in the mounted state. FIG. 2 shows a side view of the mounted hitch ball 10 with a hitch ball socket 14 (shown in phantom lines) mounted onto it.

Figure 3:
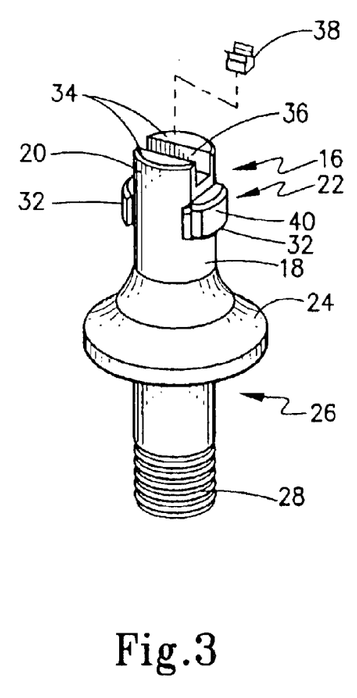
FIG. 3 is a perspective view of a first embodiment of a mounting element with an exploded view of spring clip used therewith.
Figure 4:
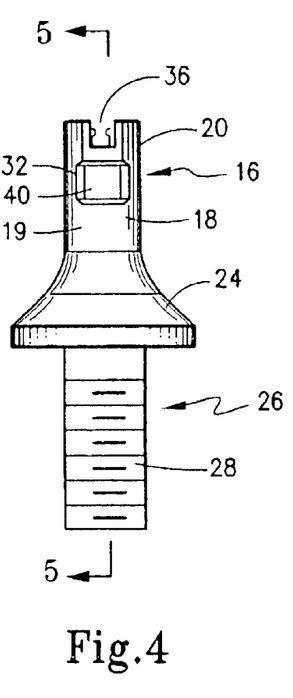
FIG. 4 is a side view in elevation of a first embodiment of the mounting element of FIG. 3.
Figure 5:
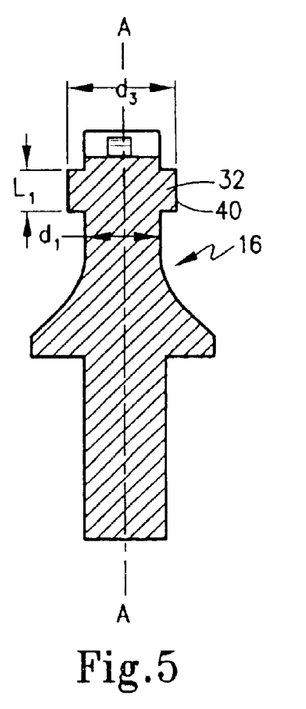
FIG. 5 is a sectional view of the mounting element taken about lines 5—5 of in FIG. 4.
Figure 12:
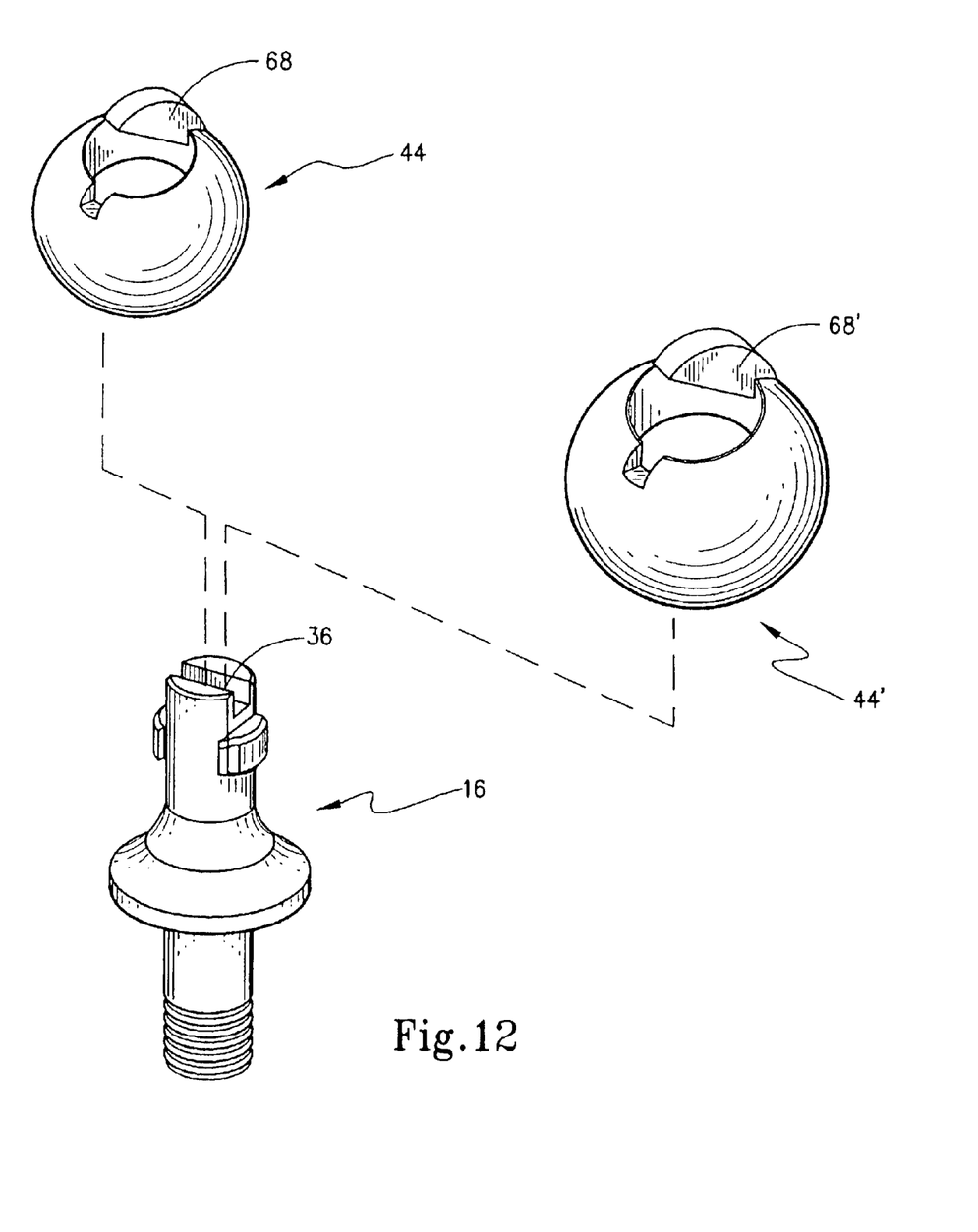
FIG. 12 is a perspective view of the first embodiment showing two differently sized interchangeable hitch balls in the unlatch position for alternative and selectable mounting on the mounting element.
Figure 13:
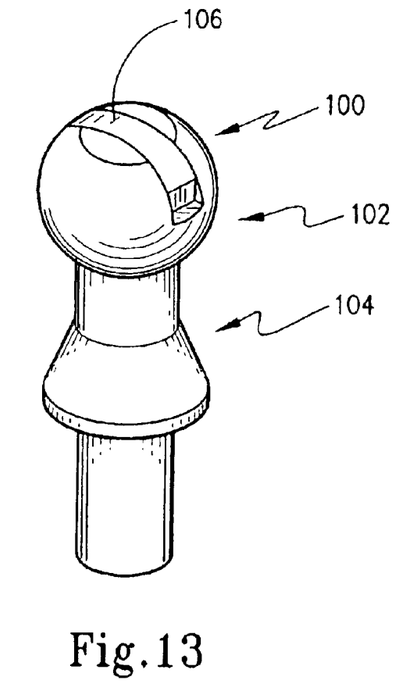
FIG. 13 is perspective view of the second embodiment of the hitch ball assembly according to the present invention with the latch in the latch position.
Figure 14:
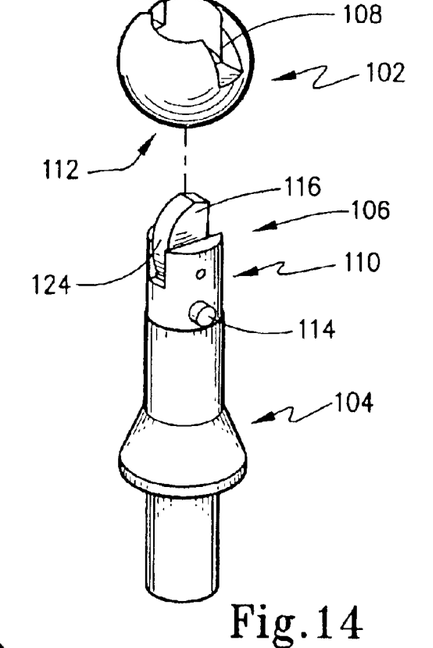
FIG. 14 is a perspective view of the second embodiment with the latch in the unlatch position and with the hitch ball element oriented in the first rotational position and removed from the mounting element.
Figure 15:
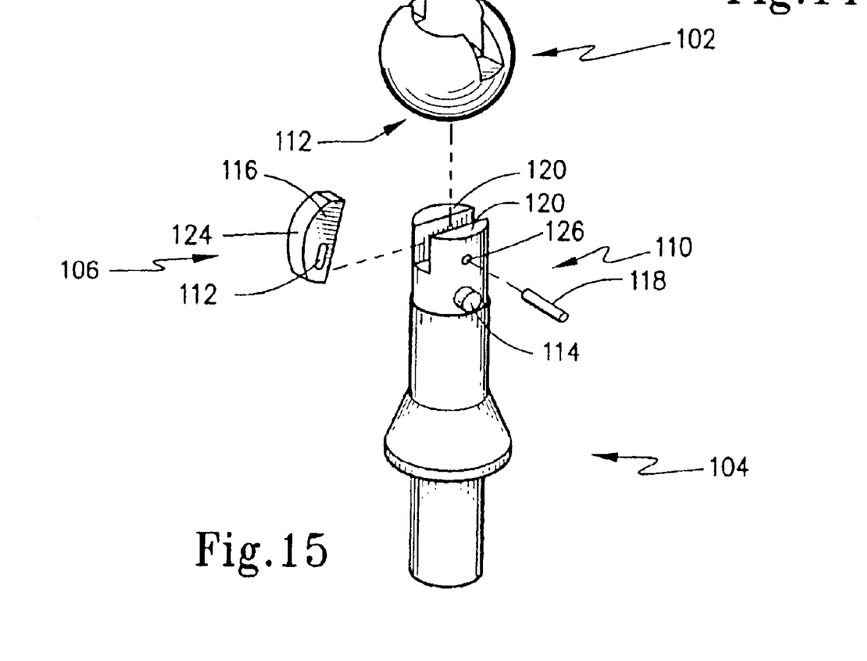
FIG. 15 is an exploded, perspective view of the second embodiment.

The details of the mounting element 16 are best seen in FIGS. 3 through 5. The mounting element 16 includes an upright post 18, a base 24, and a mounting shank 26. The base 24 and mounting shank 26 provide structure to allow the mounting element to be affixed to a tow bar 12. While FIGS. 3 through 12 refer to a first embodiment of the present invention, the details of the mounting shank 26 and base 24 apply equally to both of the embodiments presented here. FIGS. 13 through 15 depict features of the second embodiment.

The mounting shank 26 includes threads 28 which permit the shank 26 to be attached to a tow bar 12 with a nut 30. FIG. 2 best shows this mounting configuration. The base 24 is of a frustoconical shape to provide a load-bearing surface between the mounting element 16 and the tow bar 12. One skilled in the art can appreciate that there are others means of rigidly attaching the mounting element 16 and the tow bar 12. These may include providing a threaded cavity within the base 24, opposite of the upright post, for bolting to the tow bar 12 or direct welding of the base 24 to the tow bar 12.

Beginning with the first embodiment, and still referring to FIGS. 3 through 5, the upright post 18 is a cylindrical portion 19 extending along a longitudinal axis A from the base 24 and has a diameter $d_1$. The post 18 includes a key structure 22 which is comprised of at least one ear 32 which extends radially and beyond the outer surface of the upright post 18. FIGS. 3 through 5 show the first embodiment to include two ears 32 which are diametrically opposed. The ears 32 are tabs, rectangular in shape, which are affixed on opposite sides of the upright post 18. The ears 32 include outer faces 40 which are curved, or radiused, to form an outer diameter $d_3$ of the key structure 22 where $d_3$ is greater than $d_1$. As indicated in FIG. 5, the ears 32 have a selected ear height, $l_1$. One skilled in the art can see that the ears 32 need not necessarily be of a rectangular shape but may also be circular or of any other shape that serves the same functional purpose. The upright post 18 terminates in a cylindrical free end portion 20 with a transverse face 34. The transverse face 34 is a flat surface which is perpendicular to the longitudinal axis A but it may also be curved or cut at another angle with respect to the longitudinal axis A.

A latch notch 36, in the shape of a rectangular slot, is formed into the free end portion 20. The latch notch 36 is positioned along a line perpendicular to the longitudinal axis A that is parallel with a radial line defined by the protrusion direction of the ears 32. As will be discussed in a later section, the notch 36 is sized to receive a latching component. The latch notch 36 also contains a spring clip 38 which is sized and shaped to mechanically grip the latching component.

Figure 6:
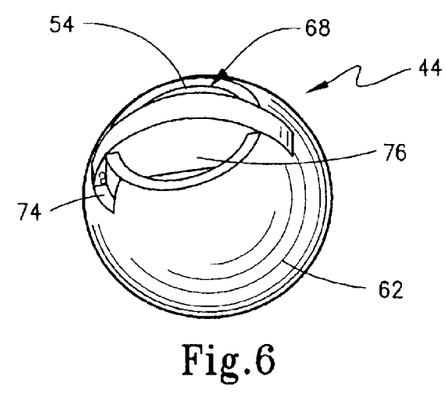
FIG. 6 is perspective view of a first embodiment of an interchangeable hitch ball with the latch in the latch position.
Figure 7:
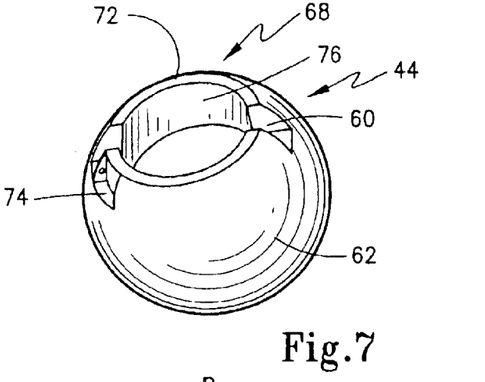
FIG. 7 is a perspective view of a first embodiment of an interchangeable hitch ball with the latch in the unlatch position.
Figure 8:
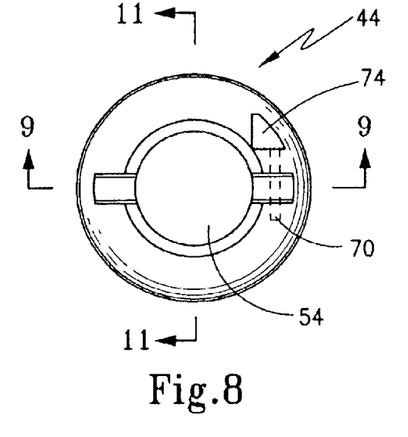
FIG. 8 is a top plan view of the first embodiment of an interchangeable hitch ball.

The hitch ball element 44 of the first embodiment is shown in various views and sections in FIGS. 6 through 11. A perspective of the hitch ball element 44 including the latch element 68 is shown in the latch position in FIG. 6 while FIG. 7 shows it in the unlatch position. The hitch ball element 44 is generally a spherical shape with a spherical outer surface 62 and a radius $r_1$. A rotational axis B, coincident with the center of the spherical outer surface 62 and indicated in FIGS. 9 and 11, defines the axis about which the hitch ball element 44 is rotated when mounting the hitch ball element 44 onto the mounting element 16. The axis B also defines the centerline for a passageway 46 formed within the hitch ball element 44.

The general structure of the passageway 46 is configured so that the hitch ball element 44 is engaged in the latch position onto the mounting element 16 by: (1) positioning the hitch ball element 44 such that its opening, the entryway 50, engages the free end portion 20 of the upright post 18 and then rotating the hitch ball 44 to a first rotational orientation (with respect to longitudinal axis A) wherein the hitch ball element 44 is enabled to move into a mated state with the post 18; and (2) rotating the hitch ball element 44 to a second rotational position wherein the latch mechanism can be moved into the latch position.

More specifically, the passageway 46 includes an entryway 50 leading to an internal cavity 52 which terminates at the other end of the hitch ball element 44 with a cylindrical bore 54. The entryway 50 includes a circular central opening 56 with a diameter $d_4$ and channels 58. The diameter $d_4$ is chosen such that it is larger than the diameter $d_1$ of the upright post 18 but is smaller than the outer diameter $d_3$ of the ears 32. Formed into this central opening 56 are two channels 58 which are grooves running parallel to the rotational axis B with a selected depth and width and positioned on opposite sides of the central opening 56 to allow the ears 32 of the mounting element 16 to pass within them when the hitch ball element 44 is positioned in the first rotational orientation for its insertion onto the mounting element 16.

Figure 9:
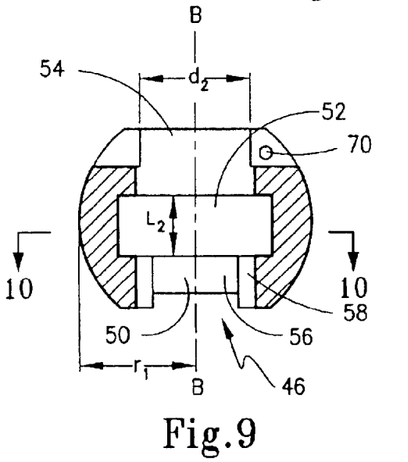
FIG. 9 is a sectional side view of the interchangeable hitch ball taken about lines 9—9 of FIG. 8.
Figure 10:
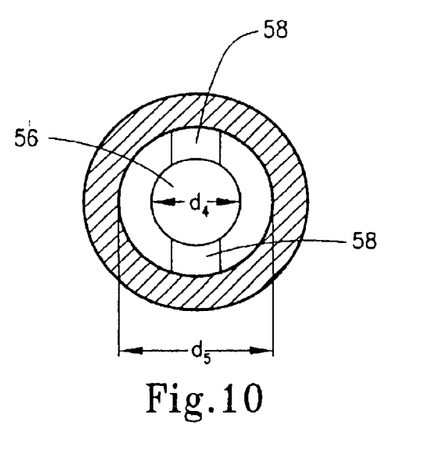
FIG. 10 is a sectional top plan view taken about lines 10—10 of the interchangeable hitch ball in FIG. 9.
Figure 11:
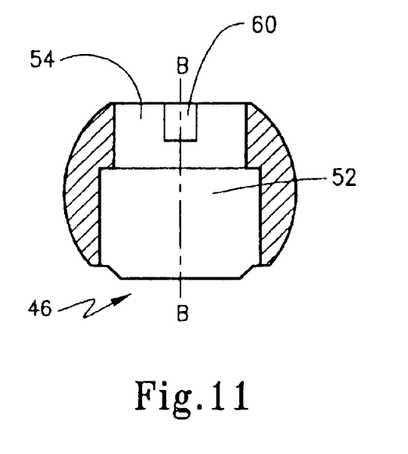
FIG. 11 is a sectional side view taken about the lines 11—11 of the interchangeable hitch ball in FIG. 8.

Still referring to FIGS. 8 through 11, the internal cavity 52 is annular shaped with an outer cavity diameter $d_5$, as indicated in FIG. 10, and with an inner cavity diameter $d_4$, the diameter defined by the central opening 56. The outer cavity diameter, $d_5$, is sized such that it is greater than the ear outer diameter, $d_3$. As indicated in FIG. 9, the cavity 52 has an axial length $l_2$ which is selected to be greater than the ear height $l_1$. In this manner, when the hitch ball element 44 and the mounting element 16 are in the first rotational position, the hitch ball element 44 is free to rotate (either clockwise or counter-clockwise) to bring it to its second rotational position.

The end of the internal cavity 52 opposite the entryway 50 contains a cylindrical bore 54 within which the free end portion 20 of the upright post 18 resides when the hitch ball element 44 and mounting element are in either the first or second rotational position. The bore 54 has a bore diameter, $d_2$, which exceeds the post 18 diameter, $d_1$, and which is less than the ear outer diameter, $d_3$, so that the ears 32 cannot pass into cylindrical bore 54 when the hitch ball element is in the first or second rotational position. The bore diameter $d_4$ may be the same as the central opening diameter $d_2$.

The preferable orientation of the ears 32 and the corresponding channels 58 is for them to be on opposite sides of the upright post 18 and central opening 56, respectively. However, one skilled in the art can appreciate that they may be orientated in other positions with respect to the longitudinal axis A and the rotational axis B and also that only one ear 32 and channel 58 are necessary for the operation of the mechanism described herein.

Still referring to the first embodiment FIGS. 6 through 11, the hitch ball element 44 has a latch element 68 mounted onto it which moves between an unlatch and a latch position. The latch element 68 includes of an arm 76 which is pivotally pinned into one end of a transverse, radial groove 60 that passes through the hitch ball element 44 intersecting the bore 54. The groove 60 is sized such that the arm 76 rests within it when in the latch position as seen in FIGS. 1, 2, and 6. The groove 60 is a linear channel located on a line that is both perpendicular to the rotational axis B and perpendicular to a radial line which intersects the channels and the rotational axis B.

The arm 76 is a disk-shaped section of a circular shape with a curved surface 72. Referring to FIGS. 2 and 6, the shape of the curved surface 76 is such that when the latch element 68 is in the latch position, the curved surface 76 conforms to the radius $r_1$ of the hitch ball element 44. In this manner, as depicted in FIG. 2, the latch element 68 does not interfere with the use of a standard hitch ball socket 14 when employing the hitch ball element 44. As seen in FIGS. 6 through 9, the hitch ball element 44 may also contain a recess 74 on its outer surface which is a notch within the surface to facilitate the installation of the pin 70 which affixes the latch element 68 to the hitch ball element 44.

When the hitch ball element 44 is in the second rotational position, the latch notch 36 is aligned with the arm 76 and the notch is sized such that the arm 76 can be pivoted towards the hitch ball element 44 and into the latch position where it engages the latch notch 36 and the groove 60 and thus prevents rotation of the hitch ball element 44 with respect to the mounting element 16. To remove the hitch ball element 44, the arm 76 must be pivoted away from the latch notch 36 sufficiently far enough to allow the mounting element 16, and hence, the latch notch 36, to rotate into the first rotational position. A spring clip 38 is affixed within the latch notch 36 and serves to mechanically grip the sides of the arm 76 thus holding it in the latch position and preventing inadvertent movement from this position.

It should be appreciated from the description provided that hitch ball elements 44 of selectable sizes can be utilized. FIG. 12 shows a perspective of a mounting element 16 along with hitch ball elements 44, 44' of two different radii, $r_1$. This figure shows the hitch ball elements 44, 44' with latch elements 68, 68' in the unlatch position. The hitch ball elements 44, 44' are in the rotational orientation such that, when either of the hitch ball elements 44, 44' are placed onto the mounting element 16, they are in the first rotational position. Rotating the hitch ball element 44, 44' by 90 degrees in either the clockwise or counter-clockwise direction then places the assembly in the second rotational position. Once that is accomplished, the latch element 68, 68' is in alignment with the latch notch 36 and the latch element 68, 68' can be pivoted into the latch position.

A second embodiment of the present invention, interchangeable hitch ball assembly 100, is shown in FIGS. 13 through 15. Similar to the first embodiment, this embodiment includes a hitch ball element 102, a mounting element 104, a latch element 106 and a latch notch 108. This embodiment is similar to that already described in that the hitch ball element 102, of a selectable size, is mounted onto the mounting element 104 by placing it in the first rotational position wherein the free end portion 110 of the mounting element 104 can enter the passageway 112 of the hitch ball element 102. The hitch ball element 102 can then be rotated to its second rotational position wherein the latch element 106 can be moved into a latch position thereby preventing the hitch ball element 104 from rotating or being removed. FIGS. 14 and 15 show the hitch ball element 102 orientated in the first rotational position (with respect to the mounting element 104) while FIG. 13 shows the assembly in the second rotational position and in the latch position.

As seen in FIGS. 14 and 15, and similar to the first embodiment, the mounting element 104 includes a pair of ears 114. In this embodiment the ears 114 are cylindrical posts which extend radially outward from the longitudinal axis of the mounting element 104. They functionally serve the same purpose as the ears 32 described in the first embodiment.

Also mirroring the first embodiment, the passageway 112 of hitch ball element 102 includes a similar internal geometry, with the same geometric relationships between it and the mounting element 104, necessary for the described operation of the first embodiment of the hitch ball assembly.

The significant difference between the two embodiments is found in the location, geometry and operation of the latch element 106. In the second embodiment the latch element 106 is located on the free end portion 110 of mounting element 104 whereas in the first embodiment the latch element 68 is located on the hitch ball element 44. As seen in FIGS. 14 and 15, the latch element 106 includes a latch arm 116 which has a shape similar to that of the latch arm 76 of the first embodiment (see FIGS. 6 and 7). The latch arm 116 includes an elongated slot 112. The free end portion 110 of the mounting element 104 includes a pair of spaced-apart supports 120 positioned to create a groove across the face of the end portion 110 that is perpendicular to the radial line defined by the extension of the ears 114. The supports 120 each contain a hole 126 through which an axle pin 118 is placed.

When in the assembled state (reference FIG. 14) the axle pin 118 passes through the elongated slot 112 in the latch arm 116 to hold it in-place between the two supports 120. The slot 112 and hole 126 positions are such that the latch arm 116 can be rotated from the upright, or unlatch, position shown in FIG. 14 to the latch position, as depicted in FIG. 13. When rotated into the latch position the latch arm 116 engages a latch notch 108 located on the hitch ball element 102. This latch notch 108 serves the same purpose as the latch notch 36 in the first embodiment to engage the latch arm 116 and prevent the hitch ball element 102 from rotating from the second rotational position to the first rotational position.

The latch arm 116 is a disk-shaped section of a circular shape with a curved surface 124. Similar to the first embodiment, and comparing FIGS. 1 and 13, the curved surface 124 is such that, when the hitch ball element 102 is in the latch position, the exposed curved surface 124 presents a surface which is continuous with the outer surface of the hitch ball element 102 permitting its use with conventional hitch ball sockets. The slot 122 in the latch arm 116 is present to allow the lateral positioning of the latch arm 116, when moved to the latch position, such that it can be centered within the latch notch 108 and present the described continuous outer surface.

The preferable for fabrication of the described embodiments is steel of sufficient strength to withstand the operational loads encountered in towing a vehicle. However, one skilled in the art should understand that any material with adequate strength and stiffness can suffice for its manufacture.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from th inventive concepts contained herein.

I claim:

1. A hitch ball assembly for towing a trailer comprising:

(A) a mounting element adapted to be secured to a vehicle, said mounting element including an upright post having a cylindrical free end portion with a selected diameter and extending along a longitudinal axis, said free end portion having a key structure disposed thereon of a selected size and shape;

(B) a hitch ball element having
  (1) a passageway extending along a rotational axis with an entryway that is keyed to the size and shape of said key structure such that in a first rotational orientation, said free end portion may be inserted into the passageway of said hitch ball element to define a mated state and removed from the passageway, and
  (2) an internal cavity communicating with the passageway and configured to permit relative rotation of said hitch ball element on said free end portion when in the mated state between the first rotational orientation and a second rotational orientation wherein said key structure is trapped in the cavity such that said hitch ball element and said free end portion cannot be disengaged from one another;

(C) a latch notch located on one of said hitch ball element and said mounting element; and (D) a latch element disposed on another of said hitch ball element and said mounting element and movable between a latch position and an unlatch position such that, when said hitch ball element and said free end portion are in the mated state with said hitch ball element in the second rotational orientation, said latch element can be moved
  (1) into the latch position so as to engage the notch and thereby prevent said hitch ball element from moving from the second rotational orientation to the first rotational orientation, and
  (2) into the unlatch position permitting rotation of said hitch ball element from the second rotational orientation to the first rotational orientation.

2. A hitch ball assembly according to claim 1 wherein the passageway includes a cylindrical bore diametrically opposite the entryway and having a bore diameter sized for close-fitted mating with said free end portion.

3. A hitch ball assembly according to claim 1 wherein said mounting element includes a base and a mounting shank extending from said base, said upright post extending from said base oppositely of said mounting shank.

4. A hitch ball assembly according to claim 1 wherein said key structure includes at least one ear projecting radially outwardly of said free end portion to define a radial ear dimension and an ear height in a longitudinal direction.

5. A hitch ball assembly according to claim 4 wherein said entryway has a circular central opening of an opening diameter that is less than the radial ear dimension yet sized to receive said free end portion, said entryway having at least one channel extending from the circular opening to the cavity and sized to permit passage of said ear therethrough when said hitch ball element is in the first rotational position.

6. A hitch ball assembly according to claim 5 wherein said internal cavity is annular with an outer cavity diameter that is greater than the radial ear dimension and an inner cavity diameter that is less than the radial ear dimension.

7. A hitch ball assembly according to claim 6 wherein the annular internal cavity has a depth greater than the ear height.

8. A hitch ball assembly according to claim 1 wherein said hitch ball element has a spherical outer surface at a sphere radius, and wherein said latch element has a curved surface formed generally at the sphere radius and being mounted such that, when said hitch ball element and said free end portion are in the mated state and said latch element is in the latch position, the curved surface forms a continuation of the spherical outer surface of said hitch ball element.

9. A hitch ball assembly according to claim 1 wherein said latch element is pivotally mounted on said hitch ball element.

10. A hitch ball assembly according to claim 9 wherein said free end portion terminates in a transverse face, the latch notch being defined by a slot located in the transverse face.

11. A hitch ball assembly according to claim 10 wherein a spring clip is located within said slot whereby said spring clip mechanically grips the latch element in the latch position.

12. A hitch ball assembly according to claim 1 wherein said latch element is pivotally mounted on said free end portion.

13. A hitch ball assembly according to claim 12 wherein said free end portion includes a pair of spaced-apart supports in opposed relation to one another, said latch element being disposed between said supports on an axle pin.

14. A hitch ball assembly according to claim 13 wherein said latch element has an elongate slot formed therethrough and sized for loose-fitted, sliding engagement with said axle pin.

15. A hitch ball assembly for towing a trailer comprising:
(A) a mounting element adapted to be secured to a vehicle, said mounting element including an upright post having a cylindrical free end portion with a selected diameter and extending along a longitudinal axis, said free end portion including a pair of ears projecting radially outwardly therefrom and oppositely one another to define an ear diameter;
(B) a hitch ball element having
    (1) a passageway extending along a rotational axis with an entryway having a circular central opening that is sized to receive the free end portion of said post and having a pair of longitudinally extending channels that are sized to receive said ears for passage therethrough, such that in a first rotational orientation, said free end portion may be inserted into the passageway of said hitch ball element to define a mated state and removed from the passageway, and
    (2) an internal cavity communicating with the passageway and having a cavity diameter that is greater than the ear diameter such that the cavity is configured to permit relative rotation of said hitch ball element on said free end portion when in the mated state between the first rotational orientation and a second rotational orientation wherein said ears are trapped in the cavity such that said hitch ball element and said free end portion cannot be disengaged from one another;
(C) a latch notch located on one of said hitch ball element and said mounting element; and
(D) a latch element disposed on another of said hitch ball element and said mounting element and movable between a latch position and an unlatch position such that, when said hitch ball element and said free end portion are in the mated state with said hitch ball element in the second rotational orientation, said latch element can be moved
    (1) into the latch position so as to engage the notch and thereby prevent said hitch ball element from moving from the second rotational orientation to the first rotational orientation, and
    (2) into the unlatch position permitting rotation of said hitch ball element from the second rotational orientation to the first rotational orientation.

16. A hitch ball assembly for towing a trailer according to claim 15 wherein said hitch ball element has a spherical outer surface at a sphere radius, and wherein said latch element has a curved surface formed generally at the sphere radius and being mounted such that, when said hitch ball element and said free end portion are in the mated state and said latch element is in the latch position, the curved surface forms a continuation of the spherical outer surface of said hitch ball element.

17. A hitch ball assembly for towing a trailer according to claim 15 wherein said latch element is pivotally mounted on said hitch ball element.

18. A hitch ball assembly for towing a trailer according to claim 17 wherein said free end portion terminates in a transverse face, the latch notch being defined by a slot located in the transverse face.

19. A hitch ball assembly for towing a trailer according to claim 18 wherein a spring clip is located within said slot whereby said spring clip mechanically grips the latch element in the latch position.

20. A hitch ball assembly for towing a trailer according to claim 15 wherein said latch element is pivotally mounted on said free end portion.

21. A hitch ball assembly for towing a trailer according to claim 20 wherein said free end portion includes a pair of spaced-apart supports in opposed relation to one another, said latch element being disposed between said supports on an axle pin.

22. A hitch ball assembly for towing a trailer according to claim 21 wherein said latch element has an elongate slot formed therethrough and sized for loose-fitted, sliding engagement with said axle pin.

23. In a tow hitch adapted for towing a trailer, the improvement comprising a hitch ball assembly including:
(A) an upright post having a cylindrical free end portion with a selected diameter and extending along a longitudinal axis, said free end portion having a key structure disposed thereon of a selected size and shape;
(B) a hitch ball element having
    (1) a passageway extending along a rotational axis with an entryway that is keyed to the size and shape of said key structure such that in a first rotational orientation, said free end portion may be inserted into the passageway of said hitch ball element to define a mated state and removed from the passageway, and
    (2) an internal cavity communicating with the passageway and configured to permit relative rotation of said hitch ball element on said free end portion when in the mated state between the first rotational orientation and a second rotational orientation wherein said key structure is trapped in the cavity such that said hitch ball element and said free end portion cannot be disengaged from one another;
(C) a latch notch located on one of said hitch ball element and said upright post; and
(D) a latch element disposed on another of said hitch ball element and said upright post and movable between a latch position and an unlatch position such that, when said hitch ball element and said free end portion are in the mated state with said hitch ball element in the second rotational orientation, said latch element can be moved
    (1) into the latch position so as to engage the notch and thereby prevent said hitch ball element from moving from the second rotational orientation to the first rotational orientation, and
    (2) into the unlatch position permitting rotation of said hitch ball element from the second rotational orientation to the first rotational orientation.

24. In a tow hitch adapted for towing a trailer, the improvement comprising an interchangeable hitch ball assembly including:
   (A) an upright post having a cylindrical free end portion with a selected diameter and extending along a longitudinal axis, said free end portion having a key structure disposed thereon of a selected size and shape, and a latch notch located on said post, and;
   (B) at least two hitch ball elements of different sizes, each said hitch ball element having
      (1) a passageway extending along a rotational axis with an entryway that is keyed to the size and shape of said key structure such that in a first rotational orientation, said free end portion may be inserted into the passageway to define a mated state and removed from the passageway,
      (2) an internal cavity communicating with the passageway and configured to permit relative rotation of said hitch ball element on said free end portion when in the mated state between the first rotational orientation and a second rotational orientation wherein said key structure is trapped in the cavity such that said hitch ball element and said free end portion cannot be disengaged from one another, and
      (3) a latch element movable between a latch position and an unlatch position such that, when said hitch ball element and said free end portion are in the mated state with said hitch ball element in the second rotational orientation, said latch element can be moved
         (a) into the latch position so as to engage the notch and thereby prevent said hitch ball element from moving from the second rotational orientation to the first rotational orientation, and
         (b) into the unlatch position permitting rotation of said hitch ball element from the second rotational orientation to the first rotational orientation.

25. A hitch ball assembly according to claim 24 wherein said key structure includes a pair of ears projecting radially outwardly of said free end portion and opposite one another to define a radial ear dimension and an ear height in a longitudinal direction.

26. A hitch ball assembly according to claim 24 wherein the entryway of each of said hitch ball elements has a circular central opening of an opening diameter that is less than the radial ear dimension yet sized to receive said free end portion, the entryway having at least two channels extending from the circular opening to the cavity and sized to permit passage of said ears therethrough when a respective said hitch ball element is in the first rotational position.

27. A hitch ball assembly according to claim 26 wherein said internal cavity is annular with an outer cavity diameter that is greater than the radial ear dimension and an inner cavity diameter that is less than the radial ear dimension.

28. In a tow hitch adapted for towing a trailer, the improvement comprising an interchangeable hitch ball assembly including:
   (A) an upright post having a cylindrical free end portion with a selected diameter and extending along a longitudinal axis, said free end portion having a key structure disposed thereon of a selected size and shape;
   (B) at least two hitch ball elements of different sizes, each said hitch ball element having
      (1) a passageway extending along a rotational axis with an entryway that is keyed to the size and shape of said key structure such that in a first rotational orientation, said free end portion may be inserted into the passageway to define a mated state and removed from the passageway, and
      (2) an internal cavity communicating with the passageway and configured to permit relative rotation of said hitch ball element on said free end portion when in the mated state between the first rotational orientation and a second rotational orientation wherein said key structure is trapped in the cavity such that said hitch ball element and said free end portion cannot be disengaged from one another;
      (3) a latch notch disposed therein; and
   (C) a latch element disposed on said upright post and movable between a latch position and an unlatch position such that, when a respective said hitch ball element and said free end portion are in the mated state with the respective said hitch ball element in the second rotational orientation, said latch element can be moved
      (1) into the latch position so as to engage the notch and thereby prevent the respective said hitch ball element from moving from the second rotational orientation to the first rotational orientation, and
      (2) into the unlatch position permitting rotation of the respective said hitch ball element from the second rotational orientation to the first rotational orientation.

29. A hitch ball assembly according to claim 28 wherein said key structure includes a pair of ears projecting radially outwardly of said free end portion and opposite one another to define a radial ear dimension and an ear height in a longitudinal direction.

30. A hitch ball assembly according to claim 28 wherein the entryway of each said hitch ball element has a circular central opening of an opening diameter that is less than the radial ear dimension yet sized to receive said free end portion, the entryway having at least two channels extending from the circular opening to the cavity and sized to permit passage of said ears therethrough when the respective said hitch ball element is in the first rotational position.

31. A hitch ball assembly according to claim 30 wherein said internal cavity is annular with an outer cavity diameter that is greater than the radial ear dimension, and with an inner cavity diameter that is less than the radial ear dimension, and wherein said annular cavity has a depth greater than the ear height.

32. An interchangeable hitch ball assembly for towing a trailer comprising:
   (A) a mounting element adapted to be secured to a vehicle, said mounting element including an upright post having a cylindrical free end portion with a selected diameter and extending along a longitudinal axis, said free end portion having a key structure disposed thereon of a selected size and shape;
   (B) at least two hitch ball elements of differing sizes and each having
      (1) a passageway extending along a rotational axis with an entryway that is keyed to the size and shape of said key structure such that in a first rotational orientation, said free end portion may be inserted into the passageway of said hitch ball element to define a mated state and removed from the passageway, and
      (2) an internal cavity communicating with the passageway and configured to permit relative rotation of said hitch ball element on said free end portion when in the mated state between the first rotational orienta tion and a second rotational orientation wherein said key structure is trapped in the cavity such that said hitch ball element and said free end portion cannot be disengaged from one another;

(C) a latch notch located on all of said hitch ball elements or on said mounting element; and (D) a latch element disposed on another of all of said hitch ball elements and said mounting element and movable between a latch position and an unlatch position such that, when said hitch ball element and said free end portion are in the mated state with said hitch ball element in the second rotational orientation, said latch element can be moved (1) into the latch position so as to engage the notch and thereby prevent said hitch ball element from moving from the second rotational orientation to the first rotational orientation, and (2) into the unlatch position permitting rotation of said hitch ball element from the second rotational orientation to the first rotational orientation.

* * * * *